UNITED STATES PATENT OFFICE 2,199,180

PROCESS FOR THE CONVERSION OF NORMALLY GASEOUS MONO-OLEFINS TO NORMALLY LIQUID PRODUCTS

Kenneth C. Laughlin, Baton Rouge, La., assignor to Standard Oil Development Company, a corporation of Delaware No Drawing. Application January 19, 1937, Serial No. 121,290

7 Claims. (Cl. 196—10)

The present invention relates to the production of normally liquid hydrocarbons from normally gaseous olefins. It has for its purpose the improvement of the well-known sulfuric acid polymerization process, particularly that specific process in which a mixture of iso- and normal butylenes is subjected to the action of 60% to 75% $H_2SO_4$ under conditions which favor the copolymerization of said butylenes.

There are a number of problems involved in the acid polymerization of olefins, either with phosphoric or sulfuric acid. With both acids, corrosion of the reactor is an operating difficulty. To overcome this the use of a lead-lined reactor has been resorted to, but this expedient has not eliminated the difficulty. In general, phosphoric acid is more corrosive under the operating conditions.

It has now been found that corrosion of the reactor, whether or not it be lead-lined, is greatly diminished by the conjoint use of sulfuric and phosphoric acids. The sulfuric acid employed is preferably of a strength between 55 and 75%. The phosphoric acid employed is preferably of a strength between 50% and 85%. While for copolymerization, sulfuric acid of at least 55% should be employed, it is possible, when mixed acids are employed, to use a weaker sulfuric acid, such as 50%, and add enough stronger phosphoric acid to bring up the combined acid strength to a suitable strength, such as 60%.

The reduction in corrosion is realized by the use of the mixed acids in almost any proportion. A mixture of equal parts of $H_2SO_4$ and $H_3PO_4$ is suitable although it is preferable to have the sulfuric acid in excess. Typical mixtures which may be employed are ⅔ of 60% $H_2SO_4$ and ⅓ of 57.5% $H_3PO_4$, 75% of 60% $H_2SO_4$ and 25% of 57.5% $H_3PO_4$, 75% of 60% $H_2SO_4$ and 25% of 75% $H_3PO_4$, 60% of 50% $H_2SO_4$ and 40% of 75% $H_3PO_4$, 85% of 50% $H_2SO_4$ and 15% of 85% $H_3PO_4$, 75% of 40% $H_2SO_4$ and 25% of 85% $H_3PO_4$, 75% of 45% $H_2SO_4$ and 25% of 85% $H_3PO_4$, 50% of 40% $H_2SO_4$ and 50% of 80% $H_3PO_4$ and 40% of 60% $H_2SO_4$ and 60% of 75% $H_3PO_4$. In these mixtures the parts are by volume. The majority of them are suited primarily for copolymerization of iso- and normal butylenes. It is to be understood that the proportions may be adjusted to give a mixed acid of a strength best suited for the feed stock to the polymerization unit.

The feed to the unit is usually a refinery gas, such as a stabilizer gas, a cracking or distillation gas. These gases contain substantial amounts of $C_3$ and $C_4$ olefins and also some sulfur compounds. It is preferred to subject the gases to a preliminary caustic wash to remove as much sulfur as possible. Even when this is done, the product usually contains some sulfur.

While the addition of phosphoric acid to the sulfuric acid was primarily adopted to cut down corrosion, it was found that the expedient resulted in an inexplicable reduction of the sulfur in the product. In many instances, too, with a mixed iso- and normal butylene feed, it was found that the mixed acids increased the ratio of normal to isobutylene reacted. This is very desirable, since the greater this ratio the greater is the yield of branched polymers for a given quantity of isobutylene.

The reaction temperature is usually the same as that employed with sulfuric acid alone. For copolymerization this lies between about 150° F. and 300° F. It is noteworthy that with the mixed acids it is possible to operate at higher temperatures within this range without encountering undesirable side reactions to the extent to which these occur at said higher temperatures with sulfuric acid alone.

For polymerization of isobutylene alone, the temperature will be between 100° F. and 200° F. and the mixed acid strength is usually between 60% and 75%. For normal butylenes the best temperature is between 100° F. and 200° F. and the mixed acid strength between 80% and 90%. For propylene the best temperature is between 100° F. and 250° F. and the mixed acid strength between 80% and 90%. When propylene is contained in the butylene feed, it is preferred to keep the reaction temperature above 200° F.

It is customary to employ a sufficiently high pressure to maintain the feed stock in the liquid state during the reaction. Pressures of the order of 200 to 600 lbs./sq. in. are usually sufficient for this purpose. If desired, the reaction may be conducted in the gas phase by using a somewhat lower pressure. In such case, it is advisable to introduce the feed stock into the mixed acids in the liquid state so as to obtain the requisite degree of dispersion of said feed stock. Dispersion is best achieved by introducing the feed stock through a porous thimble or by using a feed jet having an extremely small internal diameter such as 0.011 in., 0.018 in., 0.022 in., 0.030 in., etc.

The process is carried out by contacting the normally gaseous olefins, or gases containing them, with a body of mixed sulfuric and phosphoric acids. The body of acid may be immobile, but is usually circulating either counter-current to or concurrent with the hydrocarbons, preferably the latter. With concurrent circulation, the mixture of acid and reactants is passed from the reaction chamber to a separator from the bottom of which the acid is withdrawn and, after suitable regeneration and adjustment of its concentration, is returned to the reaction chamber.

The product is withdrawn from the top of the separator and fractionated, the unconverted gas being recycled to the reaction chamber, or, if too low in olefins, to a cracking or catalytic dehydrogenation zone or to a thermal polymerization zone in the known manner. The polymers boiling within the gasoline range are, preferably, hydrogenated.

It is to be understood that the improvement of the present invention is applicable both to processes in which polymerization occurs immediately on contact with the acid and to those in which the olefins are first absorbed at a lower temperature and then the acid is heated to polymerization temperature. The latter procedure is usually applied when it is desired to selectively polymerize a certain olefin in a feed containing other olefins.

The advantages of the present invention may be better understood from the following illustrative examples:

*Example 1*

Two runs were made in an apparatus in which the hydrocarbon feed stock was introduced through a jet having an internal diameter of 0.022 in. In one run the acid employed was 60% $H_2SO_4$. In the other run the acid employed was a mixture of three volumes of 60% $H_2SO_4$ and one volume of 57.5% $H_3PO_4$. The feed stock contained 10.1% of isobutylene and 20.9% of normal butylene. The pressure employed was 400 lbs./sq. in. The temperature in each case was maintained at about 225° F. and the feed rate was between 11 and 12 liters per hour. In each case the body of acid was 3 ft. high. The results were as follows:

|  | $H_2SO_4$ | Mixed acid run |
|---|---|---|
| Weight percent yield on I-$C_4H_8$: | | |
| Based on exit gas measure | 134 | 131 |
| Based on olefin reduction | 124 | 140 |
| Exit gas: | | |
| Percent I-$C_4H_8$ | 1.8 | 2.8 |
| Percent N-$C_4H_8$ | 19.3 | 16.7 |
| Ratio of iso- to normal butylene reacted | 1.8/1 | 1.34/1 |
| Polymer: | | |
| I. B. P., °F | 83 | 88 |
| Percent @ 300° F | 69 | 67 |
| Percent recovery | 84 | 81 |
| Percent sulfur | 0.21 | 0.045 |

It is to be noted that while the yield in the run with the mixed acid based on olefin reduction was substantially greater than that obtained with sulfuric acid alone, the ratio between isobutylene and normal butylene in the exit gas of the former was much greater than in the exit gas of the latter, indicating that in the former a considerably larger amount of normal butylene went into the product. That the products in the two cases were different is indicated by the per cent over at the various temperatures.

*Example 2*

Two runs were made in an apparatus having a feed jet with an internal diameter of 0.018 in. In the first run the acid was 60% $H_2SO_4$. In the second run the acid was a mixture of two volumes of 60% $H_2SO_4$ and one volume of 57.5% $H_3PO_4$. The pressure in each run was about 400 lbs./sq. in., and the temperature was between 225° and 230° F. In each run the feed rate was 9 liters per hour in an acid column of 3 ft. in height and the feed stock was the same as in Example 1. The results were as follows:

|  | $H_2SO_4$ run | Mixed acid run |
|---|---|---|
| Weight percent yield on I-$C_4H_8$: | | |
| Based on exit gas measure | 161 | 150 |
| Based on olefin reduction | 158 | 168 |
| Exit gas: | | |
| Percent I-$C_4H_8$ | 0.9 | 0.8 |
| Percent N-$C_4H_8$ | 16.9 | 16.0 |
| Polymer: | | |
| I. B. P., °F | 89 | 104 |
| Percent @ 300° F | 67 | 72 |
| Percent recovery | 81 | 84 |
| Percent sulfur | 0.21 | 0.12 |

It is to be noted that in this case the difference between the products of the two runs was somewhat more pronounced. In this pair of runs, as in the pair described in Example 1, the sulfur content of the product obtained with the mixed acid was considerably below that of the product obtained with sulfuric acid alone.

*Example 3*

The relative effect of sulfuric acid of a given concentration and a mixture of sulfuric and phosphoric acid having substantially the same acid concentration on lead was ascertained by heating test pieces of lead at a temperature of 220° F. for two weeks in the respective acids. The loss of weight suffered by the lead is interpreted as penetration in inches per year in the following table.

| | Acid mixture | | Penetration in inches/yr. |
|---|---|---|---|
| 85 percent $H_3PO_4$ parts by volume | $H_2SO_4$ | | |
| | Concentration (weight percent) | Parts by volume | |
| 15 | 50 | 85 | 0.03 |
| 25 | 40 | 75 | 0.005 |
| 25 | 45 | 75 | 0.015 |
| 0 | 60 | 100 | 0.09 |

While the present invention exhibits its greatest utility in polymerization processes conducted at 200° F. and higher, it is applicable in any process in which reactive gases are contacted at an elevated temperature with sulfuric acid. It is also applicable in the acid treatment of hydrocarbons of all types, particularly in the recently developed process of desulfurizing olefinic naphthas by dissolving them at an elevated temperature in dilute sulfuric acid and cooling or diluting the solution to separate therefrom desulfurized gasoline.

The nature and objects of the present invention having been thus described and illustrated what is claimed as being new and useful and is desired to be secured by Letters Patent is:

1. A process for the conversion of normally gaseous mono-olefins to normally liquid hydrocarbons boiling within the gasoline range which comprises contacting said olefins at a temperature between about 150° F. and about 300° F.

with a mixture of sulfuric and phosphoric acids in a ratio of between about 2 and about 3 volumes of 60% sulfuric acid per volume of 57.5% phosphoric acid.

2. A process as in claim 1 wherein the polymerization is carried out under superatmospheric pressure.

3. A process as in claim 1 wherein the polymerization is carried out under superatmospheric pressure and wherein the feed rate is between about 9 and about 12 liters per hour.

4. A process for the conversion of normally gaseous mono-olefins to normally liquid mono-olefins boiling within the gasoline range, which comprises contacting said olefins at a temperature of about 225° F. under a superatmospheric pressure of about 400 lbs./sq. in. at a feed rate between about 11 and about 12 liters per hour with a mixture of sulfuric and phosphoric acids in a ratio of about 3 volumes of 60% sulfuric acid per volume of 57.5% phosphoric acid.

5. A process as in the preceding claim wherein the feed stock comprises isobutylene and normal butylenes.

6. A process for the conversion of normally gaseous mono-olefins to normally liquid mono-olefins boiling within the gasoline range which comprises contacting said olefins at a temperature of about 225° F. under a superatmospheric pressure of about 400 lbs./sq. in. at a feed rate of about 9 liters per hour with a mixture of sulfuric and phosphoric acids in a ratio of about 2 volumes of 60% sulfuric acid per volume of 57.5% phosphoric acid.

7. A process as in the preceding claim wherein the feed stock comprises isobutylene and normal butylenes.

KENNETH C. LAUGHLIN.